United States Patent [19]

Colvin et al.

[11] Patent Number: 4,902,775

[45] Date of Patent: Feb. 20, 1990

[54] RUBBER VULCANIZATION AGENTS OF SULFUR OLEFIN ADDUCT

[75] Inventors: Howard A. Colvin, Tallmadge; Charles L. Bull, Jr., Akron; Fredrick L. Magnus, Mogadore, all of Ohio

[73] Assignee: The Goodyear Tire & Rubber Company, Akron, Ohio

[21] Appl. No.: 228,425

[22] Filed: Aug. 5, 1988

Related U.S. Application Data

[60] Continuation-in-part of Ser. No. 78,320, Jul. 27, 1987, abandoned, which is a division of Ser. No. 896,688, Aug. 15, 1986, Pat. No. 4,739,036.

[51] Int. Cl.$^4$ .............................................. C08G 75/14
[52] U.S. Cl. .................................................... 528/389
[58] Field of Search .................... 528/389; 106/287.32

[56] References Cited

U.S. PATENT DOCUMENTS

| | | | |
|---|---|---|---|
| 1,349,909 | 8/1920 | Pratt | 528/389 |
| 2,410,595 | 11/1946 | Bacon | 528/389 |
| 4,475,953 | 10/1984 | Ludwig | 106/287.24 |
| 4,740,559 | 4/1988 | Johansson | 528/389 |

FOREIGN PATENT DOCUMENTS 114469 4/1988 South Africa .

*Primary Examiner*—Christopher Henderson
*Attorney, Agent, or Firm*—Bruce J. Hendricks

[57] ABSTRACT

Superior vulcanization agents for rubber are prepared by reacting sulfur with at least one olefin at 120°–200° C. in an aqueous reaction media with agitation. In one embodiment, the vulcanization agent comprises a sulfur/olefin adduct having from about 39% to about 46% by weight of free elemental sulfur level.

11 Claims, 2 Drawing Sheets

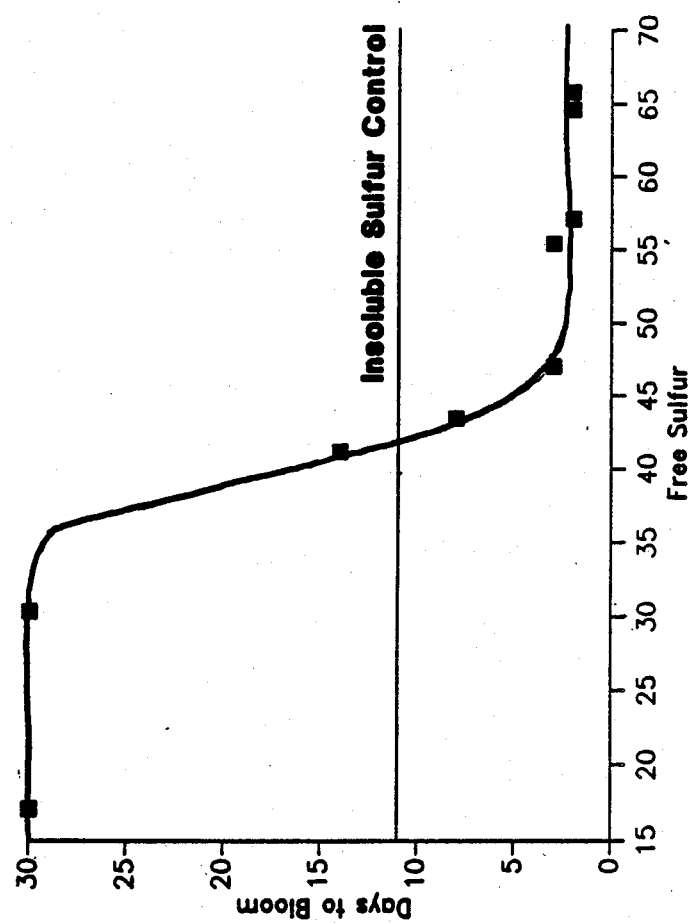

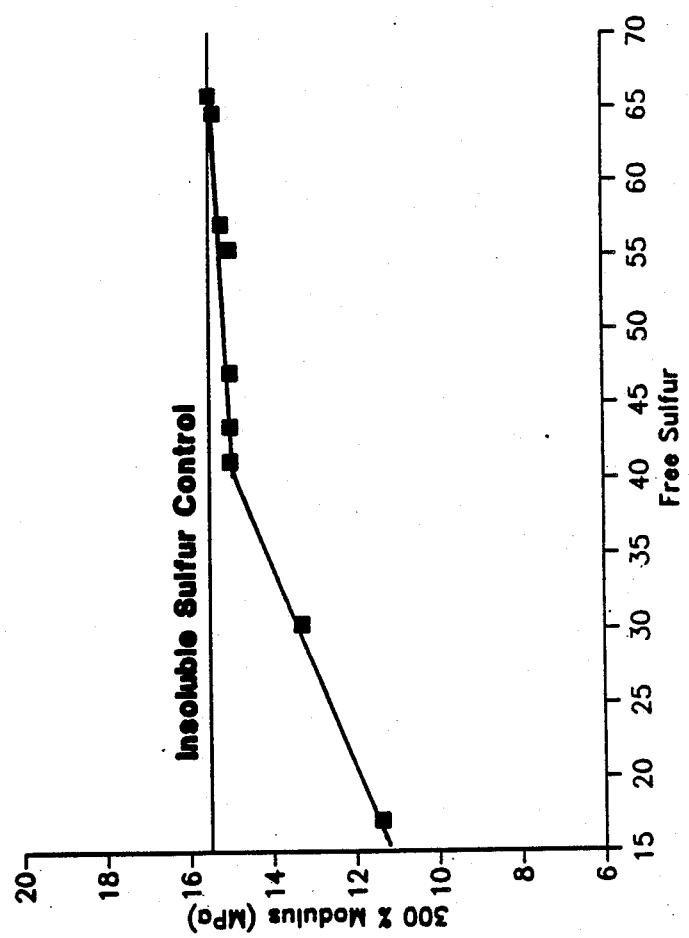

RUBBER VULCANIZATION AGENTS OF SULFUR OLEFIN ADDUCT

This is a continuation-in-part of U.S. Ser. No. 078,320, filed July 27, 1987 now abandoned, which was a divisional application of U.S. Ser. No. 896,688 filed Aug. 15, 1986 now issued as U.S. Pat. No. 4,739,036.

TECHNICAL FIELD

This invention relates to vulcanization agents for rubber. The invention also relates to vulcanizates which comprise a major portion of rubber and a minor proportion of the vulcanization agent.

BACKGROUND ART

Developing rubber compounds containing high sulfur levels has been a serious problem for the rubber industry and one which has received a great deal of attention. Problems attributable to high levels of sulfur in the rubber include migration of the sulfur to the surface of the rubber stock commonly referred to as "bloom" which causes decrease of tack at the surface of the rubber stock.

Compounds containing high sulfur levels can exhibit problems with sulfur bloom on the surface of the unvulcanized rubber. This surface layer of sulfur crystallizes causing a loss of building tack which can cause problems in tire building.

Numerous modifications of standard rubber processing techniques have been utilized to minimize the sulfur bloom tendencies. These prior methodologies include the use of insoluble sulfur in the compound; limiting the compound mixing temperatures during the sulfur addition stage: and minimizing the heat history that the compound is exposed to during processing.

Insoluble sulfur is formed by rapidly quenching molten sulfur that is above 159° C. (preferably 200°–250° C.). This product consists primarily of long chain sulfur molecules and a lesser amount of soluble $S_8$ rings. There is a tendency for the long chain molecules to revert to the more stable soluble form if exposed to higher temperatures, long storage times and/or hostile storage environments.

Commercial insoluble sulfur products contain a stabilizer to reduce this tendency. When insoluble sulfur is mixed in a rubber compound, it exists as more or less discreet particles of varying size in the rubber phase. Above about 118° C. substantial reversion to the soluble sulfur form occurs with resulting sulfur bloom.

An approach taken over the years has been to combine sulfur with an unconjugated diene which is believed to enhance the compatibility with the rubber. The polymeric structure is also believed to improve the stability of the sulfur chains against breakdown to soluble $S_8$ units at normal storage and processing temperatures yet readily allow the release of sulfur for crosslinking at vulcanizing temperatures.

U.K. Pat. No. 1,232,056 discloses a method of preparing a vulcanizing agent for natural and synthetic rubbers which comprises heating together at a temperature of from 100°–250° C. between 3 and 50 parts by weight of sulfur and one part by weight of a conjugated diolefin in the presence of a catalytic amount of an amine, such as a dimethyl-substituted tertiary amine.

U.S. Pat. No. 2,989,513 discloses a rubber composition comprising natural or synthetic elastomers and from about 1 to 12% by weight based on the weight of said rubber of a curing agent comprising at least one interpolymer of sulfur and an olefinic hydrocarbon selected from styrene, alpha-methylstyrene, butene, isobutylene, diisobutylene, triisobutylene, ethylene and propylene.

U.S. Pat. No. 3,544,492 discloses an improved curing agent which is a resinous composition formed by the reaction of one or more olefinic materials and a s-triazine, substituted with three groups containing activated terminal unsaturation and sulfur.

U.S. Pat. No. 3,264,239 discloses a process and a vulcanizing agent which comprises preparing a mixture of sulfur, linseed oil and dicyclopentadiene, heating the resulting mixture at 125°–135° C. for at least 5 hours to form an interpolymer, and cooling and isolating the interpolymeric product.

U.S. Pat. No. 3,523,926 discloses a vulcanizing agent for rubbers which is prepared by heating conjugated diolefins with sulfur in the presence of catalytic amounts of amines.

U.S. Pat. No. 4,564,670 describes a disperse sulfur product formed by dispersing particulate sulfur in a liquid poly(cis-isoprene) dispersion agent. The product can be formed by simply mixing the liquid poly(cis-isoprene) dispersion agent with a major amount of sulfur until the desired product results.

Canadian Pat. No. 965,231 claims a method for improving the dispersibility of insoluble sulfur in rubber which comprises admixing insoluble sulfur containing up to about 70% by weight soluble sulfur with from about 0.3 to 5% by weight based on the total weight of the sulfur of a dispersing aid selected from a specific group of alkyl-phenoxypoly(ethyleneoxy)ethanol compounds.

Japanese Publication No. 57-133135 discloses a rubber composition with improved sulfur bloom characterized by the addition of triisopropanolamine, diisopropanolamine, monoisopropanolamine or blends thereof to a rubber composition composed of 2 to 10 weight parts of sulfur as a vulcanizing agent blended in 100 parts of rubber selected from natural rubber, synthetic rubber or rubber blended from the two.

From a review of the prior art methodologies for preparing sulfur/olefin adducts, it is quite apparent that the reaction product of sulfur and an olefin results or can result in materials that are viscous liquds or solids. For example, U.S. Pat. No. 3,259,598 teaches that a sulfur, linseed oil, styrene reaction product can be used to vulcanize rubber. The product from this reaction mixture must be pulverized before it can be incorporated into the elastomer due to the physical properties of the sulfur/olefin adduct.

Uniform dispersion of the sulfur in the rubber is a prerequisite for uniform vulcanization and vulcanizates with optimum mechanical properties and many sulfur-/olefin vulcanizing compositions of the prior art require that grinding or milling steps be performed on the sulfur/olefin adduct prior to its use in rubber. This problem has been overcome through the instant invention wherein the sulfur/olefin adducts are which are prepared by reacting sulfur and an olefin at 140°–160° C. with agitation in water which optionally contains a base as a catalyst and a dispersing agent. The prior art does not suggest or disclose sulfur/olefin adducts which are prepared by heating sulfur, an olefin, water, base and optionally a dispersing agent to 120°–200° C. with agitation, cooling the reaction mixture and filtering the sulfur/olefin adduct beads.

The water serves as a medium in which the sulfur can melt and react with the olefin to produce the product in particle form. When the reaction mixture is cooled, the sulfur/olefin adduct is frozen into a bead form. The water also acts as a heat sink for the exothermic reaction.

DESCRIPTION OF THE DRAWINGS

FIG. 1 graphically depicts the effect of free sulfur on bloom resistance in compounded rubber.

FIG. 2 graphically depicts the effect of free sulfur on 300% modulus in compounded rubber.

DISCLOSURE OF THE INVENTION

There is disclosed a novel vulcanizing agent for natural and synthetic rubbers, said vulcanizing agent is prepared by heating together with agitation at a temperature of from 120°–200° C. between 1 and 50 parts by weight of sulfur and 1 part by weight of an olefin or olefins in an aqueous reaction media in the presence of a basic catalyst and a dispersing agent.

There is further disclosed a sulfur/olefin adduct containing from about 39% to about 46% by weight of free sulfur and prepared according to a process which includes the steps of (1) heating to a temperature of from 120° C. to about 200° C. with agitation, an aqueous suspension containing (a) a mixture of sulfur and at least one olefin, or (b) the reaction product of sulfur melt and at least one olefin: wherein the aqueous suspension is heated for a time sufficient to form a granular sulfur/olefin adduct: and (2) isolating the granular sulfur/olefin adduct.

There is also disclosed a rubbery vulcanizate comprising (a) from about 88% to about 99.5% by weight of a rubbery compound selected from the group comprising natural and synthetic polyisoprenes, polybutadienes, polychloroprenes, copolymers of isobutylene and isoprene, copolymers of butadiene-1,3 and styrene, copolymers of butadiene-1,3 and acrylonitrile in addition to other standard compounding ingredients: and (b) from 0.5 to 12% by weight of a granular sulfur/olefin adduct containing from about 39% to about 46% by weight of unreacted free sulfur and prepared in a process which includes the step of heating to a temperature of from 120° C. to about 200° C. with agitation an aqueous suspension containing a dispersing agent, from about 1.0 to about 60 parts water and one part of (a) a mixture of sulfur and at least one olefin, or (b) the reaction product of sulfur melt and at least one olefin; wherein the aqueous suspension is heated for a time sufficient to form a granular sulfur/olefin adduct.

The rubbers useful as ingredients in the vulcanizates of this invention include rubbery materials having available unsaturation such as natural and synthetic vulcanizable rubbers an rubbery polymers of dienes preferably of open chain conjugated dienes having from 4 to 8 carbon atoms. Specific examples of rubbery materials which may benefit from the sulfur/olefin adducts of this invention are natural rubber, polybutadiene-1,3, polyisoprene, poly-2,3-dimethyl-butadiene-1,3, poly-2-chlorobutadiene-1,3 and the like. Other rubbers useful are the synthetic rubbers such as those obtained from 1,3-dienes by copolymerization with each other or with at least one copolymerizable monomer such as isobutylene, styrene, acrylonitrile, methylacrylate, ethylacrylate, methyl methacrylate, 4-vinyl pyridine and the like. The polymeric diene rubbers generally contain at least 50% by weight of the diene and preferably contain from about 55–85% by weight of the diene. However, copolymers, terpolymers and other multicomponent polymers containing as little as 35% or less by weight of diene can also be employed. Still other rubbery materials can be used in the practice of this invention such as unsaturated polymers containing acid groups obtained by the copolymerization of a major amount of a conjugated diene with an olefinically unsaturated carboxylic acid. Still other rubbers can be employed such as those formed by the copolymerization of dienes with alkyl acrylates and by the polymerization of an alkyl acrylate with at least one other unsaturated monomer followed by hydrolysis. Rubbery polyesterurethanes, polyetherurethanes and polyesteramideurethanes having curable double bonds or available unsaturation and rubber reclaimed from the foregoing can also be used. Mixtures of two or more of the foregoing rubbers may be employed as ingredients in the vulcanizates of this invention. The preferred rubbers are the natural and synthetic polyisoprenes, the polybutadienes, the polychloroprenes, the copolymers of isobutylene with isoprene, copolymers of butadiene-1,3 with styrene, and copolymers of butadiene-1,3 with acrylonitrile.

The novel sulfur/olefin adducts produced according to the present invention comprise adducts of sulfur and one or more olefinic compounds. Specific olefinic compounds which are useful in the present invention include but are not limited to olefinic hydrocarbons such as ethylene, propylene, butene, isobutylene isopentene, diisobutylene, triisobutylene, hexyl-2-decene-1, and heptadecene-7; cycloalkenes such as cyclopentene and cyclohexene; unsaturated terpenes such as pinene, camphene, and myrcene; aralkenes such as styrene, dihydronaphthalene, indene, alpha-methyl styrene and polyolefins such as butadiene, isoprene, chloroprene, cyclopentadiene, dicyclopentadiene, cyclohexadiene, vinyl cyclohexene, 1,7-octadiene, cyclooctadiene and the like. The preferred olefinic compounds are styrene, alpha-methyl styrene, cyclopentadiene and dicyclopentadiene with a combination of styrene and dicyclopentadiene being particularly preferred. When one desires to employ more than one olefin, the weight ratios of the olefins to each other may vary widely depending on the particular olefins and the desired properties of the sulfur/olefin adduct. Generally, when one is using two olefins, the weight ratio may vary from about 1:1 to about 15:1. In a particularly preferred embodiment, the weight ratio between the two olefins ranges from about 4:1 to about 11:1.

Elemental sulfur is used in preparing the sulfur/olefin adduct curing agents of this invention.

A catalyst may be employed to facilitate the formation of the sulfur/olefin adduct although they are not necessary. Representative of the basic materials which may be used to catalyze the formation of the sulfur/olefin adduct include calcium carbonate, sodium carbonate, sodium hydroxide, tetramethylethylene diamine and the like.

A preferred group of sulfur/olefin adducts of the present invention contain from about 39% to about 46% by weight of unreacted free sulfur. It has been discovered that at lower levels of free sulfur, the adduct has good bloom resistance but does not disperse well in the rubber. At higher free sulfur levels, the adduct disperses well but blooms rapidly. Most preferably, the free elemental sulfur is from about 41 to about 44% by weight of the sulfur/olefin adduct.

The granular sulfur/olefin adducts are prepared by heating to a temperature of from 120° C. to about 200° C. an aqueous suspension containing a dispersing agent and from about 1.0/1 to about 60/1 parts water to sulfur plus olefin. To this aqueous suspension is added either a mixture of sulfur and an olefin, with an optional base or the reaction product of sulfur melt and an olefin. Accordingly, the granular sulfur/olefin adducts may be prepared in a one step (sulfur and olefin is initially reacted in the aqueous suspension) or two step procedure (sulfur/olefin reaction product added to aqueous suspension) so long as an aqueous suspension is employed in the final stages of preparation. If one elects to use the one step procedure, one may admix the water, sulfur, olefin, dispersing agent and optional base to form an aqueous mixture, agitate the mixture to form a suspension, and heat the suspension at a temperature for a time sufficient to form the granular sulfur adduct.

The reaction time will vary for the one step procedure depending on the reaction temperature. In order to form the preferred sulfur/olefin adducts having a free elemental sulfur level ranging from about 39% to about 46%, the reaction time should range from about 2 hours to about 6 hours with a reaction temperature of from 150° to about 160° C.

According to another embodiment, a two step procedure may be used to prepare a sulfur/olefin adduct having from about 39% to about 46% free elemental sulfur. The first step involves reacting sulfur melt and an olefin to form an intermediate product. The temperature of the reaction is conducted at a temperature high enough to maintain the sulfur in a melt stage. Generally, the temperature of the reaction may range from about 120° C. to about 159° C. Preferably, the temperatures of the reaction will not exceed 150° C. because the viscosity of the intermediate product increases and may cause solidification of the product into a cement-like product. In the second step, the intermediate product is charged to the aqueous suspension for continued reaction, i.e., crosslinking and granulation of the product. If the second step is to immediately follow the first step, the liquid intermediate reaction product may be charged to the aqueous suspension. If one desires to halt the preparation, one many allow the intermediate reaction product to cool and solidify. The solid intermediate reaction product is then ground to smaller particles and charged to the aqueous suspension for completion of the reaction. As a matter of general teaching of a two-step procedure in making a sulfur/olefin adduct, the disclosure of EP 86307122.1 is incorporated herein in its entirety. To achieve a free sulfur level of 39-46% using this process, the reaction time in either step, olefin composition, sulfur/olefin ratios, olefin ratio and reaction temperatures should be considered. Standard regression techniques enable one skilled in the art to determine the interrelation between the above variables to achieve a free sulfur level of 39-46%.

Representative of the dispersing agents that may be used in the aqueous suspension include polyethylene oxides, carboxymethyl cellulose, polyvinylalcohol, and the like. Preferably, polyvinylalcohol is used to form the granular sulfur/olefin adduct. The reaction is advantageously and necessarily carried out in an aqueous suspension to accomplish the benefits of the instant invention. However, as noted above, the sulfur and olefin may have been reacted previously with the reaction product being added to the aqueous suspension for additional reaction. The weight ratio of water to sulfur plus olefin can vary from 1:1 to 60:1. Preferably the ratio is 7:1 to 4:1 with 5:1 being most preferred. The weight ratio of sulfur to olefin can vary from 1:1 to 50:1, with a range of from about 4:1 to 6:1 being preferred.

The sulfur/olefin adduct curing agents of this invention are prepared in an aqueous suspension conducted at temperatures in the range of from 120° C. to 200° C. and preferably from 140–160° C. Most preferably, the aqueous suspension reaction is conducted at least 150° C. At temperatures below 145° C., the beads after isolation will agglomerate unless a cross-linkable monomer such as divinylbenzene is used in conjunction with a peroxide in the reaction mixture. The reaction, since it is conducted above the boiling point of water, is necessarily conducted in a closed vessel such as an autoclave.

The vulcanizates of this invention comprise as essential ingredients a major proportion of a single rubbery material or a mixture of two or more rubbery materials and a minor proportion of a single or a mixture of sulfur/olefin adduct curing agents. In a particularly preferred embodiment of the present invention, the sulfur/olefin adduct has a free elemental sulfur level ranging from about 39% to about 46% by weight of the total weight of the sulfur/olefin adduct. In addition to the sulfur/olefin adduct, conventional compounding ingredients may be added to the vulcanizates. These compounding ingredients include reinforcing agents, fillers, accelerators, plasticizers, antioxidants, age resistors, resins, dyes, color pigments and the like in the amounts customarily employed in the rubber industry.

The sulfur/olefin curing agent of this invention is useful in the range of from about 0.5 to about 12 parts by weight per 100 parts by weight of the rubbery material to be vulcanized. The preferred range is from about 1 to about 5 parts by weight per 100 parts of rubbery material. The rubber stocks containing the curing agent and other appropriate compounding ingredients can be mixed on a mill or other suitable mixing device such as a Banbury and the resulting blend can be cured at temperatures of from about 120° C. to about 180° C. and preferably at from about 130°–160° C.

The vulcanizates of the present invention are useful in tire components, such as treads, tire sidewalls, carcass stocks, apex and wirecoat stocks. Other products which can use this invention include rollers, colored rubber articles and wherever it is desired to provide a stable elastomer that does not exhibit sulfur bloom.

In the following illustrative examples, the amounts of ingredients are given in parts by weight unless otherwise specified.

Comparative Example 1 —Reaction of DCPD with Sulfur

Into a 500 ml flask equipped with a temperature controller, nitrogen inlet tube and mechanical stirrer were placed 255 g of sulfur, 75 g of dicyclopentadiene (DCPD) and 3 g of N,N,N',N'-tetramethylethylene diamine (TMEDA). The flask was flushed with nitrogen and the mixture was heated to 140° C. Stirring was started when the sulfur had melted. The reaction exothermed to 165° C. and become too viscous to stir in 25 minutes The product solidified at 165° C. and upon cooling resembled concrete.

Comparative Example 2

Into a 500 ml flask equipped with a temperature controller, nitrogen inlet tube and mechanical stirrer were placed 270 g of sulfur, 30 g of DCPD and 0.6 g of TMEDA. The flask was flushed with nitrogen and the mixture was heated to 140° C. for 45 minutes. The hot product was poured into an aluminum pan where it eventually solidified. The reaction flask was discarded because of the difficulty involved in cleaning off the product.

Comparative Example 3

Into a three gallon autoclave was charged 1237.5 grams of sulfur, 60.0 grams of calcium carbonate, 262.5 grams of DCPD, 7200 grams of water and 3.0 grams of Vinol 540 PVA. The reaction mixture was heated to 125° C. for 3 hours, then to 162° C. for 75 minutes. The reactor was cooled and the product was filtered. Analysis shows the product containing approximately 32.4% free sulfur.

PRESENT INVENTION

Example 1

Into a one liter autoclave were placed 75 g of sulfur, 25 g of DCPD, 500 ml of water, 10 g of calcium carbonate as a catalyst, and 6.5 g of carboxymethyl cellulose as a dispersing agent. The autoclave was flushed with nitrogen and heated to 140° C. for three hours with stirring. The autoclave was cooled to 13° C. and small brown beads of product were filtered from the water. Differential scanning calorimetry showed that a reaction had occurred between the sulfur and the olefin.

Example 2

Into a 4 liter autoclave were placed 425 g of sulfur, 75 g of DCPD, 2500 ml of water, 20 g of calcium carbonate as a catalyst and 32 g of carboxymethyl cellulose as a dispersing agent. The autoclave was flushed with nitrogen and heated to 150° C. for three hours with stirring. After cooling to room temperature, small beads of brown product were filtered from the water. Differential scanning calorimetry indicated that a reaction had occurred.

Example 3

Into a 4 liter autoclave were placed 425 g of sulfur, 75 g of alpha-methylstyrene, 2500 ml of water, 20 g of calcium carbonate as a catalyst and 32 g of carboxymethyl cellulose as a dispersing agent. The autoclave was flushed with nitrogen and heated to 150° C. for three hours with stirring. After cooling to room temperature, the product was isolated as an orange powder.

Example 4 1.0 g of polyvinylalcohol (Vinol ® 203 from Air Products) was dissolved in 2500 ml of water. This solution was added to a 4 liter reactor with 425 g of sulfur, 75 g of DCPD, and 20 g of calcium carbonate. The reactor was sealed and heated with stirring to 150° C. for three hours. After cooling to room temperature, the small beads of sulfur/DCPD adduct were filtered.

Example 5

Into a 4 liter autoclave were placed 425 g of sulfur, 75 g of DCPD, 2500 ml of water, 20 g of calcium carbonate and 5.0 g of Igepal ®-630 (GAF). The reactor was sealed and heated to 150° C. for three hours with stirring. After cooling to room temperature, the sulfur/DCPD adduct was isolated as small ribbons.

Example 6

No Organic Dispersing Agent

Into a 4 liter autoclave were placed 425 g of sulfur, 75 g of DCPD, 2500 ml of water and 20 g of calcium carbonate. The reactor was then sealed and heated to 150° C. for three hours with stirring. After cooling to ambient temperature, the sulfur/DCPD adduct was isolated as small beads.

Example 7

Peroxide and Divinylbenzene

Into a 4 liter autoclave were placed 425 g sulfur, 50 g DCPD, 20 g styrene, 5 g divinylbenzene, 2500 ml of water, 20 g calcium carbonate, 32 g carboxymethyl cellulose and 7.1 g of a 70% solution of t-butylhydroperoxide in water. The reactor was sealed and heated to 140° C. for three hours. After cooling to ambient temperature, the sulfur/olefin adduct was isolated as beads.

Example 8

No Catalyst

Into a 4 liter autoclave were placed 425 g sulfur, 75 g DCPD, 2500 g water and 32 g carboxymethyl cellulose. The autoclave was sealed and heated to 150° C. for three hours with stirring. After cooling to ambient temperature, the sulfur/olefin adduct was isolated as beads.

Example 9

Into a 4 liter autoclave were charged 1800 g of water, 478 g of sulfur, 84 g DCPD, 36 g of carboxymethyl cellulose and 15 g of calcium carbonate. The reactor was sealed and heated to 150° C. for 3 hours with stirring. After cooling to room temperature, beads of sulfur/olefin adduct were isolated.

Example 10

Into a 4 liter autoclave were charged 425 g of sulfur, 75 g DCPD, 2500 ml of water, 20 g of calcium carbonate and 32 g of carboxymethyl cellulose. The reactor was sealed and heated to 150° C. for three hours with stirring. After cooling to ambient temperature, the adduct beads were filtered.

Example 11

Into a 4 liter autoclave were charged 425 g sulfur, 60 g of DCPD, 15 g styrene, 2500 ml of water, 20 g of calcium carbonate and 32 g of carboxymethyl cellulose. The reactor was sealed and heated to 150° C. for three hours with stirring. After cooling to ambient temperature, the beads were filtered.

The ability of the sulfur/olefin adduct prepared according to Examples 10 and 11 to cure rubbers was compared with that of insoluble sulfur using a prepared unvulcanized blend of natural and synthetic polyisoprene rubber.

Two rubber stocks were prepared by employing the following recipe set out in Table I. All parts are parts by weight.

TABLE I

| Component | Control | Experimental |
|---|---|---|
| Polyisoprene/Natural Rubber (Non-productive) | 176.05 | 176.05 |
| Hexamethoxy methylmelamine | 2.80 | 2.80 |
| Retarder | 0.10 | 0.10 |
| Antioxidant | 0.75 | 0.75 |
| Zinc Oxide | 3.00 | 3.00 |
| Accelerator | 0.60 | 0.60 |
| Secondary Accelerator | 0.60 | 0.60 |
| Insoluble Sulfur | 3.00 | -0- |
| Sulfur/Olefin Adduct | -0- | 2.83 |

TABLE I-continued

| Component | Control | Experimental |
|---|---|---|
| from Example 10/11 | | |

The components were mixed in a Banbury. The quantities and materials used were those typically used in the art for producing vulcanized rubber. The amount of sulfur/olefin adduct used was such that its total sulfur content was substantially equivalent in weight to the weight of sulfur used in the control. The Banbury mix time required to incorporate the sulfur/olefin adduct was similar to that required to incorporate the insoluble sulfur therein.

As an additional comparative, a commercially available sulfur/olefin adduct obtained from Wyrough and Loser, Inc. known as ThioCure-BR TM was used in place of the insoluble sulfur and the adducts from Examples 10 and 11; however, at a level of 3.0 instead of 2.83.

The vulcanizable compositions were pressed out and cured in a rubber press for about 40 minutes at 150° C. to provide cured slabs for testing. The physical properties for the controls and the experimental samples are set out in Table II.

A critical factor in the utility of rubber chemicals is how well they can be dispersed into the rubber. Clearly, if the chemicals are not well dispersed, they cannot fully take part in the cure. It has been found, through a dispersion test, that the sulfur/DCPD/styrene adduct prepared according to this invention is dispersed into rubber better than a sulfur/DCPD adduct. The test consists of mixing the material into the rubber using a Banbury, sheeting the rubber out on a mill and visually observing unbroken beads in a standard size area. The dispersion values ranged from 0-5 with 0 being complete dispersion and 5 being the poorest dispersion. The dispersion values for the controls and Examples 10 and 11 in Table II were control - 0, sulfur/DCPD - 4, sulfur/DCPD/styrene - 0, ThioCure TM BR-5. The test demonstrates that the slfur curatives prepared according to the instant invention, when DCPD and styrene are used as the olefins, had comparable dispersion ability to insoluble sulfur and much better dispersibility than the commercially avaiable ThioCure BR TM.

The data indicates that the sulfur/olefin adduct prepared according to this invention had better scorch delay than the control but cured at a slower rate. In addition, the curative from Examples 10 and 11 reached a much higher state of cure than the commercially available ThioCure BR TM.

It was further found that the vulcanizable compositions containing the sulfur/olefin adducts prepared according to this invention had bloom resistance similar to compositions made with insoluble sulfur depending on processing temperature.

TABLE II

| Physical Properties | Example 10 | Example 11 | Control | Thio-Cure |
|---|---|---|---|---|
| Rheometer, 300 F, 3 Deg. Arc, 100CPM, 60 Min. Motor | | | | |
| Torque, Min. | 15.7 | 15.8 | 15.0 | 15.6 |
| Torque, Max. | 74.1 | 75.0 | 82.7 | 61.6 |
| TS 2 | 4.2 | 4.4 | 3.7 | 4.4 |
| T'C25 | 8.3 | 8.0 | 6.3 | 9.1 |
| T'C90 | 21.7 | 21.0 | 21.2 | 28.8 |
| Scorch, MS/250 F | | | | |
| Minimum | 33. | 33. | 32. | 34. |
| T5 | 18.3 | 19.6 | 16.8 | 20.2 |
| Specific Gravity | 1.167 | 1.169 | 1.169 | 1.168 |
| Autographic Tensile | | | | |
| Tensile, psi | 2750. | 2925. | 3125. | 1925. |
| Elongation, % | 390. | 420. | 410. | 320. |
| 300% Modulus | 2100. | 2050. | 2275. | 1750. |
| Hardness, Shore A | 81. | 81. | 81. | 78. |
| Best Cure, Min. @ 300 F | 40. | 40. | 40. | 45. |
| Air Bomb Aging - 16 hrs./250 F/ 80 psi | | | | |
| Tensile, psi | 600. | 475. | 750. | 250. |
| % Change | −78. | −84. | −76. | −87. |
| Elongation, % | 160. | 60. | 170. | 90. |
| % Change | −59. | −86. | −59. | −72. |
| Hardness, Shore A | 81. | 85. | 82. | 76. |
| Point Change | 0. | 4. | 1. | −2. |

Examples 12–23

A series of designed experiments were conducted which relate reaction conditions to product performance in rubber. The major variable in predicting product performance is free sulfur. The sulfur/olefin adducts were prepared in a method as generally described in Example 11, however, the ratio of sulfur/DCPD/styrene, the reaction temperatures and reaction times were varied. The sulfur/olefin adducts contain varying amounts of free sulfur. Tables IV and V below lists the above variables for each example, the various phr of sulfur/olefin adduct, and resulting properties of each rubber composition containing the rubber stock listed in Table III below. Examples 12 and 13 were controls for comparison. Control A (Example 12) was a polymeric sulfur known as Crystex OT TM. Control B (Example 13) was a polymeric sulfur known as Crystex HS TM. Example 17 was also run for comparative purposes and was obtained from Wyrough and Loser, Inc.

Mixing of the rubber stock and sulfur/olefin adduct was performed using a 00 Banbury. Wire adhesion was determined using the SWAT method (R. Ridha et al. "Stress Analysis of Cord Adhesion Test—A Route to Approved Tests", Rub. Chem. Tech. Vol. 54, page 835 [1981]). Extrusion of the rubber stock sulfur/olefin compositions was carried out at 270° F. The bloom test lasted 10 days. The dispersion indexes were determined visually, 0 being no beads visible and 7 being the worst dispersion in the series. The percentage of free sulfur in the adduct was determined by liquid chromatographic analysis of a chloroform extract of the adduct after continuous extraction for 20 hours.

TABLE III

| | |
|---|---|
| Polyisoprene/Natural Rubber (Non-productive) | 183.00 |
| Hexamethoxymethyl melamine | 3.00 |
| Retarder | 0.20 |
| Antioxidant | 0.75 |
| Accelerator | 0.75 |

TABLE IV

| | 12 | 13 | 14 | 15 | 16 | 17 |
|---|---|---|---|---|---|---|
| Sulfur/DCPD/Styrene | Control | Control | 85/12/3 | 85/13.5/ | 85/12/3 | Thiocure |

TABLE IV-continued

|  | A | B |  | 1.5 |  | BR II |
|---|---|---|---|---|---|---|
| Reaction Temperature (°C.) | — | — | 150 | 150 | 160 | — |
| Reaction Time (hrs.) | — | — | 5 | 3 | 3 | — |
| Days to Bloom | 5 | No Bloom | 5 | 5 | 5 | 5 |
| % Free Sulfur | — | — | 55.2 | 52.9 | 52.1 | 48.8 |
| Dispersion Index | 0 | 0 | 0 | 0 | 0 | 0 |
| 300% Modulus (lbs.) | 2200 | 2250 | 2350 | 2325 | 2350 | 2225 |

|  | 18 | 19 | 20 | 21 | 22 | 23 |
|---|---|---|---|---|---|---|
| Sulfur/DCPD/Styrene | 85/13.5/1.5 | 80/16/4 | 80/16/4 | 80/16/4 | 80/18/2 | 80/18/2 |
| Reaction Temperature (°C.) | 160 | 150 | 160 | 160 | 160 | 150 |
| Reaction Time (hrs.) | 5 | 3 | 5 | 3 | 3 | 5 |
| Days to Bloom | No Bloom | No Bloom | No Bloom | No Bloom | No Bloom | No Bloom |
| % Free Sulfur | 45.8 | 39.3 | 38.7 | 36.8 | 32.9 | 32.4 |
| Dispersion Index | 2 | 3 | 7 | 5 | 5 | 5 |
| 300% Modulus (lbs.) | 2175 | 2300 | 1850 | 1950 | 1750 | 1850 |

TABLE V

|  | 12 | 13 | 14 | 15 | 16 | 17 |
|---|---|---|---|---|---|---|
| Phr | 5.0 | 5.0 | 4.7 | 4.7 | 4.7 | 5.0 |
| Min. torque | 18.0 | 18.2 | 18.7 | 19.5 | 19.0 | 19.2 |
| Max. torque | 81.2 | 80.4 | 79.0 | 78.8 | 79.2 | 79.3 |
| Delta torque | 63.2 | 62.2 | 60.3 | 59.3 | 60.2 | 60.1 |
| T 2 | 2.4 | 2.4 | 3.0 | 3.0 | 3.0 | 3.0 |
| T 25 | 5.0 | 5.0 | 6.0 | 6.3 | 5.9 | 6.3 |
| T 90 | 21.3 | 21.0 | 20.0 | 20.3 | 19.0 | 20.0 |
| MS/250 F | 11.2 | 12.5 | 13.6 | 13.0 | 12.5 | 13.5 |
| Tensile (psi) | 3100 | 3050 | 3275 | 3050 | 3150 | 3200 |
| Elongation | 390 | 405 | 425 | 400 | 405 | 430 |
| 300% Modulus | 2500 | 2250 | 2350 | 2325 | 2350 | 2225 |
| Dispersion (Initial) | 0 | 0 | 0 | 0 | 0 | 0 |
| Days to bloom | No Bloom | No Bloom | 5 | 5 | 5 | 5 |
| Wire Adhesion (pounds) |  |  |  |  |  |  |
| Original | 90 | 90 | 87 | Fail | 93 | 85 |
| Aged at |  |  |  |  |  |  |
| 5 day/90 C H20 | 52 | 52 | 67 | 70 | 71 | 69 |
| 10 day/120 C/N2 | 66 | 60 | 66 | 70 | 70 | 61 |
| 20 day/90 C H20 | 25 | 33 | 76 | 68 | 58 | 63 |
| Stebler Adhesion (Newtons) |  |  |  |  |  |  |
| Original | 73.5 | 74.9 | 54.3 | 50.8 | 97.4 | 87 |

|  | 18 | 19 | 20 | 21 | 22 | 23 |
|---|---|---|---|---|---|---|
| Phr | 4.7 | 5.0 | 5.0 | 5.0 | 4.7* | 5.0 |
| Min. torque | 19.3 | 19.0 | 19.8 | 19.3 | 20.0 | 19.7 |
| Max. torque | 72.0 | 74.5 | 55.8 | 60.4 | 55.5 | 60.4 |
| Delta torque | 52.7 | 55.5 | 36.0 | 41.1 | 35.5 | 40.7 |
| T 2 | 3.3 | 3.3 | 3.6 | 3.5 | 3.5 | 3.5 |
| T 25 | 8.5 | 6.7 | 9.8 | 9.0 | 10.0 | 9.0 |
| T 90 | 22.3 | 20.4 | 28.2 | 25.5 | 27.5 | 25.0 |
| MS/250 F | 14.4 | 13.8 | 16.4 | 15.9 | 16.6 | 16.5 |
| Tensile (psi) | 2700 | 3000 | 2075 | 2025 | 2125 | 2300 |
| Elongation | 370 | 395 | 345 | 320 | 365 | 365 |
| 300% Modulus | 2175 | 2300 | 1850 | 1950 | 1750 | 1850 |
| Dispersion (Initial) | 2 | 3 | 7 | 5 | 5 | 5 |
| Days to bloom | No Bloom | No Bloom | No Bloom | No Bloom | No Bloom | No Bloom |
| Wire Adhesion (pounds) |  |  |  |  |  |  |
| Original | 80 | 96 | 93 | 88 | 98 | 72 |
| Aged at |  |  |  |  |  |  |
| 5 day/90 C H20 | 57 | 77 | 76 | 71 | 71 | 71 |
| 10 day/120 C/N2 | 66 | 68 | 47 | 56 | 48 | 56 |
| 20 day/90 C H20 | 52 | Fail | 61 | 64 | 53 | 70 |
| Stebler Adhesion (Newtons) |  |  |  |  |  |  |
| Original | 58.7 | 92.8 | 132.1 | 168.4 | 130.5 | 155.3 |

*Sample should have contained 5.0 phr adduct.
Dispersion index is determined visually - 0 means no beads were observed on mixing.

As can be seen from Table IV above, the data are arranged in decreasing order of free sulfur. It is clear that the free sulfur in the sample is related to both bloom resistance and the 300% modulus of the compound. Samples containing between 39.3–45.8% free sulfur have both good bloom resistance and modulus equivalent to a control. Samples containing 48.8% and more free sulfur have a modulus equivalent to the control but all bloom within five days. Samples containing less than 39.3% free sulfur show excellent bloom resistance but have lower 300% modulus than the controls. This is at least in part caused by poor dispersion, as indicated by the dispersion index. The dispersion index is a visual rating of the stocks after productive mixing and one pass through the mill. A rating of 0 means there was no trace of beads observable. A rating of 1–3 means that a few undispersed beads could be seen by careful observation. A rating of greater than 3 indicated a large number of beads could be seen on the milled stock. The dispersion index roughly follows the amount of free sulfur in the adduct; the more free sulfur in the adduct, the better the dispersion.

T2 and Mooney scorch values are generally longer for the sulfur/olefin adducts than for either Control A or Control B.

Compounds mixed with sulfur/olefin adducts exhibited wire adhesion equivalent to or superior to the controls. Original adhesion was equivalent for all compounds, but the sulfur/olefin stocks had wire adhesion ranging from equivalent to 48% better than the controls in the 5 day aging test under water at 90° C. In the 20 day aging test under 90° C. water, the sulfur/olefin adducts were better than any control. In two examples (Nos. 14 and 23), the 20 day aged sample had double the adhesion strength of the average of the controls. In the 10 day aging at 120° C. under nitrogen, the sulfur/olefin stocks had adhesion equivalent to the controls except in the case of Examples 20 and 23 which had about 25% lower adhesion. Thus, sulfur/olefin adducts offer a method to improve aged wire adhesion, especially under humid conditions.

Strebler adhesion stocks containing sulfur/olefin adducts with low modulus were appreciably higher than the controls, but the effect is mostly likely due to the low modulus. Examples 16 and 19 have original adhesion which is greater than the average control value plus two standard deviations. The moduli of these two stocks, however, are equivalent to the controls. This indicates that there is a real improvement in Strebler adhesion with these adducts.

The data in Table IV can be regressed to determine what reaction conditions are necessary to obtain sulfur/olefin adducts with the desired amount of free sulfur. It was found that free sulfur could be predicted by the equation:

$$\text{Free sulfur} = 3.14 \, (\% \text{ sulfur charged}) - 0.228 \, (DCPD/\text{Styrene}) \, (Rxn \text{ time}) - 209.0 \quad R2 = 0.953$$

This equation indicates that the major component in determining the free sulfur is the percentage of sulfur charged to the reactor. The free sulfur can then be adjusted by changing either the DCPD/Styrene ratio or the time of reaction This equation was derived using standard regression analysis. The general form of the equation holds for all reactors tested but the coefficients may change if a reactor having a different configuration is used.

Examples 24–38

Another series of designed experiments were conducted which relate to the variable of percent free elemental sulfur to product performance of a rubber. The sulfur/olefin adducts were prepared with varying reaction temperatures, amounts of sulfur and olefin(s). Other components in the aqueous mixture were 3 grams of polyvinylacetate, 60 grams calcium carbonate and 7200 grams of water. The reaction time for all examples was 4 hours. The agitator speed was 750 rpm.

Table VI below lists the data for the above variables. In addition, Table V lists the free elemental sulfur level as well as the physical properties of the resulting rubber when mixed with the sulfur/olefin of each example. The rubber stock prior to being mixed with the control or sulfur/olefin is listed as the non-productive mix in Table V. The sulfur/olefin adducts were incorporated into the mix with the accelerator in the productive mix. Mixing and extrusion of the rubber-sulfur/olefin blends were carried out in a manner described in Examples 12–23 except the extrusion temperature was 260° F.

The controls (Examples 24 and 25) used Crystex OT ™.

TABLE V

| Non-Productive Mix | |
|---|---|
| Standard Malaysian Rubber - 5 CV | 100.0 |
| Stearic Acid | 1.0 |
| Zinc Oxide | 8.0 |
| N—330 Carbon Black | 50.0 |
| Wingstay 29 (antioxidant) | 0.75 |
| Wingstay 100 (antioxidant) | 1.0 |
| Cobalt naphthanate | 2.0 |
| | 162.75 |
| Productive Mix | |
| Non-Productive | 162.75 |
| Amax (accelerator) | 0.65 |
| Sulfur Source | Variable |

TABLE VI

| | 24 | 25 | 26 | 27 | 28 |
|---|---|---|---|---|---|
| Sulf/DCPD/Styrene | Control | Control | 90/10/0 | 90/10/0 | 90/6.6/3.4 |
| Phr | 4.0 | 4.0 | 3.56 | 3.56 | 3.56 |
| Free Sulfur | — | — | 55.4 | 57.1 | 65.8 |
| Dispersion Rating | 0 | 0 | 0 | 0 | 0 |
| Days to First Bloom | — | 11 | 3 | 2 | 2 |
| Min. Torque | 12.9 | 12.8 | 13.2 | 12.8 | 13.1 |
| Max. Torque | 52.1 | 52.0 | 50.1 | 50.4 | 52.6 |
| Delta Torque | 39.2 | 39.2 | 36.9 | 37.6 | 39.5 |
| Tensile (MPa) | 27.7 | 27.7 | 27.7 | 28.8 | 27.7 |
| Elongation | 500 | 500 | 510 | 530 | 500 |
| 300% Modulus (MPa) | 16.1 | 15.6 | 15.1 | 15.2 | 15.6 |
| Hardness (Shore A) | 73 | 72 | 72 | 70 | 73 |
| T 1 | 4.3 | 4.4 | 5.4 | 5.5 | 5.1 |
| T 25 | 7.5 | 8.0 | 8.9 | 8.7 | 8.3 |
| T 90 | 15.2 | 15.8 | 15.3 | 14.4 | 15.1 |
| Wire Adhesion (lbs.) | | | | | |
| Original | 70 | 65 | 68 | 68 | 72 |

| | 29 | 30 | 31 | 32 | 33 |
|---|---|---|---|---|---|
| Sulf/DCPD/Styrene | 80/20/0 | 80/13.2/6.8 | 80/13.2/6.8 | 80/20/0 | 90/6.6/3.4 |

TABLE VI-continued

| Phr | 4.0 | 4.0 | 4.0 | 4.0 | 3.56 |
|---|---|---|---|---|---|
| Free Sulfur | 17.1 | 41.1 | 43.4 | 30.3 | 64.6 |
| Dispersion Rating | 3 | 0 | 0 | 4 | 0 |
| Days to First Bloom | 30 | 14 | 8 | 30 | 2 |
| Min. Torque | 12.7 | 12.5 | 11.6 | 12.4 | 11.9 |
| Max. Torque | 33.5 | 49.9 | 48.8 | 40.8 | 52.1 |
| Delta Torque | 20.8 | 37.4 | 37.2 | 28.4 | 40.2 |
| Tensile (MPa) | 21.9 | 28.2 | 28.8 | 24.7 | 29.9 |
| Elongation | 485 | 530 | 550 | 500 | 550 |
| 300% Modulus (MPa) | 11.5 | 15.1 | 15.1 | 13.3 | 15.5 |
| Hardness (Shore A) | 65 | 72 | 72 | 68 | 70 |
| T 1 | 10.3 | 5.9 | 5.6 | 7.6 | 5.2 |
| T 25 | 16.1 | 8.8 | 8.5 | 12.2 | 8.2 |
| T 90 | 33.2 | 15.6 | 15.3 | 20.0 | 14.9 |
| Wire Adhesion (lbs.) | | | | | |
| Original | 45 | 63 | 64 | 58 | 65 |

| | 34 | 35 | 36 | 37 | 38 |
|---|---|---|---|---|---|
| Sulf/DCPD/Styrene | 85/12.5/2.5 | 90/10/0 | 90/10/0 | 90/6.6/3.4 | 90/6.6/3.4 |
| Phr | 3.76 | 4.00 | 4.00 | 4.00 | 4.00 |
| Free Sulfur | 47.0 | 55.4 | 57.1 | 65.8 | 64.6 |
| Dispersion Rating | 0 | 0 | 0 | 0 | 0 |
| Days to First Bloom | 3 | 3 | 2 | 4 | 3 |
| Min. Torque | 12.4 | 12.5 | 12.4 | 12.4 | 12.5 |
| Max. Torque | 49.8 | 50.8 | 52.6 | 53.5 | 53.4 |
| Delta Torque | 37.4 | 38.3 | 40.2 | 41.1 | 40.9 |
| Tensile (MPa) | 28.8 | 28.1 | 28.0 | 29.5 | 27.6 |
| Elongation | 535 | 510 | 500 | 550 | 480 |
| 300% Modulus (MPa) | 15.1 | 16.1 | 16.3 | 15.1 | 16.3 |
| Hardness (Shore A) | 73 | 72 | 73 | 70 | 73 |
| T 1 | 5.5 | 5.3 | 5.3 | 5.0 | 5.0 |
| T 25 | 8.8 | 8.8 | 8.9 | 8.1 | 8.5 |
| T 90 | 15.3 | 16.1 | 16.3 | 14.9 | 16.0 |
| Wire Adhesion (lbs.) | | | | | |
| Original | 63 | 68 | 70 | 66 | 67 |

FIGS. 1 and 2 graphically illustrate the data of Table VI with respect to modulus and bloom resistance. As it can be seen, modulus falls off rapidly below 39% free sulfur and bloom resistance increases significantly below 46%. Thus, the range of 39% to 46% free sulfur is critical to achieve desirable physical properties.

From the studies conducted on the sulfur/olefin adducts prepared according to this invention, it was demonstrated that elastomers cured with the product of this invention exhibited much less bloom than orthorhombic sulfur and equivalent bloom to insoluble sulfur.

INDUSTRIAL APPLICABILITY

The above Examples clearly demonstrate the utility of the sulfur/olefin curing agents of the present invention. These curing agents can be employed in a wide variety of rubber stocks and the resulting vulcanizates have physical properties comparable to those achieved with a conventional sulfur cure but with none of the attended disadvantages related to bloom. The sulfur/olefin adduct curing agents thus offer improved results over presently known commercial sulfur containing curing agents.

It is, of course, to be understood that the foregoing examples are intended to be illustrative only and that numerous changes can be made in the ingredients, proportions and conditions specifically disclosed therein without departing from the spirit of the invention as defined in the appended claims.

What is claimed is:

1. A composition of matter comprising a sulfur/olefin adduct containing from about 39% to about 46% by weight of free elemental sulfur and prepared according to a process which includes the steps of
   (a) heating to a temperature of from 120° C. to about 200° C., with agitation, an aqueous suspension containing (1) a mixture of elemental sulfur and at least one olefin, or (2) a reaction product of sulfur melt and at least one olefin, wherein the aqueous suspension is heated for a time sufficient to form a granular sulfur/olefin adduct; and
   (b) isolating the granular sulfur/olefin adduct.

2. The composition of claim 1 wherein the aqueous suspension contains from about 1.0 to about 60 parts water and one part of (1) a mixture of elemental sulfur and at least one olefin, or (2) a reaction product of sulfur melt and at least one olefin.

3. The composition of claim 2 wherein the aqueous suspension contains a dispersing agent.

4. The composition of claim 2 wherein the aqueous suspension contains a base.

5. The composition of claim 1 wherein at least two different olefins are used to form the granular sulfur/olefin adduct.

6. The composition of claim 5 wherein the two different olefins are styrene and dicyclopentadiene.

7. The composition of claim 5 wherein the weight ratio between the two olefins ranges from about 1:1 to about 15:1.

8. The composition of claim 7 wherein the weight ratio between the two olefins ranges from about 4:1 to about 11:1.

9. The composition of claim 2 wherein the aqueous suspension contains a mixture of elemental sulfur and two different olefins.

10. The composition of claim 9 wherein the aqueous suspension is heated at a temperature of from about 150° C. to about 160° C. for a reaction time of from about 2 to 6 hours.

11. The composition of claim 1 wherein the weight ratio of sulfur to olefin ranges from about 4:1 to about 6:1.

* * * * *